April 25, 1961 D. H. LOONEY ET AL 2,981,932

MAGNETIC MEMORY DEVICE AND METHOD OF MANUFACTURE

Filed Dec. 22, 1955 2 Sheets-Sheet 1

INVENTORS D. H. LOONEY
R. H. MEINKEN
BY [signature]
ATTORNEY

INVENTORS D. H. LOONEY
R. H. MEINKEN
BY Joins W. Falk
ATTORNEY

United States Patent Office 2,981,932

Patented Apr. 25, 1961

2,981,932

MAGNETIC MEMORY DEVICE AND METHOD OF MANUFACTURE

Duncan H. Looney, Summit, and Robert H. Meinken, North Plainfield, N.J., assignors to Bell Telephone Laboratories, Incorporated, New York, N.Y., a corporation of New York Filed Dec. 22, 1955, Ser. No. 554,841

13 Claims. (Cl. 340—174)

This invention relates, in general, to storage devices and more particularly to magnetic storage devices and their method of manufacture.

In many present day information processing systems, such as computers, telephone systems and the like, magnetic cores have achieved an increasing position of importance. These cores generally are of the type which have substantially rectangular hysteresis characteristics and consequently are capable of attaining either of two states of magnetization. These characteristics have proved to be highly desirable when such magnetic cores are employed as memory and switch devices in systems of the type described above.

For example, it is known in the prior art to arrange a plurality of magnetic cores in a rectangular array wherein information is stored in a two valued or binary coded manner. In a typical system of this type, such as that disclosed by Jay W. Forrester in an article entitled "Digital Information Storage in Three Dimensions Using Magnetic Cores," Journal of Applied Physics for January 1951, at pages 44 to 48, the magnetic cores are positioned in a plurality of columns and rows to define a matrix. Generally, information is written into selected cores of the matrix on a bit or word basis by altering the direction of magnetization of the cores in accordance with the information to be stored and read out of the cores by resetting the selected cores to their original states of magnetization.

In the fabrication of magnetic core arrays of this type the problem of threading the reading and writing windings through the cores frequently is a difficult and costly one. The problem further is complicated by the fact that generally each core has at least three such windings inductively coupled thereto, namely, a row winding, a column winding and a readout winding. In some applications the threading pattern of the matrix is very complex and consequently is not adaptable to available automatic core winding machinery. In still other applications where the threading pattern may be less complex, the small size of the magnetic cores utilized necessitates a slow and laborious manual threading operation. Considerable effort has in the past been expended towards the simplification of this threading problem.

In the magnetic core matrices which employ cores of toroidal configuration and of a given magnetic material the amount of current required to shift the core from one magnetic state to the other is dependent, in part, on the diameter of the hole through which the windings are threaded. Therefore, in cores of this type, it is desirable to minimize the hole diameter as much as possible and thereby reduce the current drive required to operate the core. In the prior art, however, this reduction in size has been limited not only by the increasing difficulty inherent in threading cores of small diameter, as pointed out in the above paragraph, but also by the difficulty of fabricating smaller cores.

It is an object of this invention to provide an improved magnetic memory.

It is another object of this invention to provide an improved magnetic memory device of relatively simple and inexpensive construction.

It is a further object of this invention to provide an improved magnetic memory device having relatively low current drive requirements.

It is a still further object of this invention to provide an improved magnetic memory device wherein the space for the windings is reduced to a minimum.

It is a still further object of this invention to provide an improved method for fabricating magnetic memory devices.

These and other objects are realized in an illustrative embodiment of the invention which comprises a magnetic memory device wherein the magnetic material and the windings coupled thereto form an integral unit, there being no air space between the material and the windings. In accordance with one specific embodiment of the invention this is accomplished by the application of a bead of magnetic material, such as a ferrite, to the windings of a memory array, in contradistinction to the priorly known techniques of placing the windings through and around each of a plurality of previously fabricated magnetic cores in an array.

Advantageously the bead of ferrite material may be formed from the oxides of such materials as manganese, magnesium, iron, nickel, zinc, copper, aluminum and the like. In one embodiment of the invention selected amounts of chosen ones of these oxides are mixed and blended with a suitable binder and solvent to produce a liquid slurry of uniform consistency. In another embodiment selected amounts of chosen oxides are first fired at a low temperature and then reground and blended with the binder and solvent. Each magnetic memory unit then is formed by placing a drop of the slurry or the pre-fired mixture on a crosspoint defined by insulated portions of the conductors of the matrix and firing the bead at a high temperature to form the ferrite memory unit. The term "bead" as employed herein is accordingly to be understood as meaning a memory element comprising a mass of solid magnetic material having the properties and characteristics described herein and which was solidified from a fluid state into inductive coupling with its energizing conductors.

It is a feature of this invention that a memory device comprise a bead of magnetic material.

It is another feature of this invention that a magnetic memory device comprise an integral unit of ferrite material and conductor windings.

It is still another feature of this invention that the conductors of a matrix be electrically insulated from each other at the points at which a ferrite bead is applied.

It is a further feature of this invention that a bead of ferrite material be formed by mixing and blending a plurality of metallic oxides, placing a drop of the resultant mixture on insulated portions of the conductors of a memory array and firing the bead and conductor assembly.

It is a still further feature of this invention that a bead of ferrite material be formed by mixing a plurality of metallic oxides, firing the mixture at a low temperature, grinding and blending the mixture with a binder and solvent, placing a drop of the resultant mixture on the conductor of a memory array and firing the entire assembly at a high temperature.

It is a still further feature of this invention that the conductors of a ferrite bead magnetic memory device be electrically isolated from each other by a small amount of insulating material applied between the conductors and the ferrite.

It is a still further feature of this invention that the conductors of a ferrite bead magnetic memory device be insulated from each other by the ferrite material comprising the bead.

A complete understanding of this invention and the above features thereof may be gained from the following description and accompanying drawing, in which.

Figure 1:
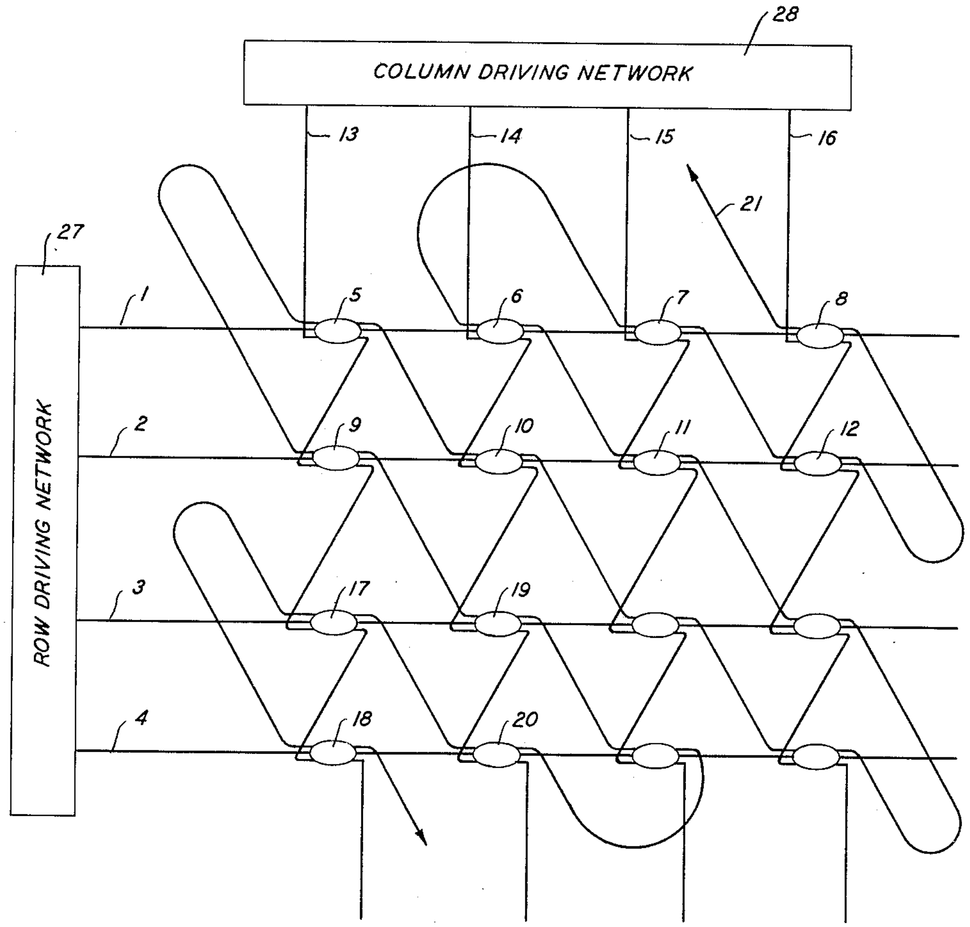
Fig. 1 is a schematic representation of a magnetic memory system comprising a rectangular array of magnetic beads.

Referring now to Fig. 1 of the drawings, there may be seen a two dimensional array of bistable magnetic memory beads. The magnetic beads are arranged in a plurality of rows and columns, there being four beads in each row and four beads in each column to define a four-by-four array. Each of the beads has three windings placed therethrough, a winding being defined as one or more turns of a conductor coupled to the magnetic bead. In accordance with the substantially rectangular hysteresis characteristics of the magnetic materials utilized in the beads, each bead may be placed in either of two states of magnetization, which states will be identified herein as the P and N magnetic conditions or states. When properly energized, the windings through a bead provide magnetomotive forces which tend to drive the beads to magnetic saturation at one or the other condition of magnetization.

The beads usually are placed in the same magnetic starting condition, for example, with an N saturation polarity. The beads which have applied thereto a magnetomotive force in excess of a critical value will be driven to magnetic saturation having the opposite or P polarity. This manifests the storage of a bit of information in each of such beads. All other beads which do not receive a magnetomotive force in excess of the critical value will remain in condition N. By proper selection and energization of a winding in each of the two dimensions a selected bead or beads may be placed in one condition of magnetic saturation or the other.

The illustrative embodiment shown in Fig. 1 comprises a plurality of conductors in the horizontal plane, namely, windings 1, 2, 3 and 4. Each of these horizontal windings is coupled to all of the magnetic beads in a row in series. For example, winding 1 is coupled to magnetic beads 5, 6, 7 and 8, winding 2 is coupled to magnetic beads 9, 10, 11 and 12, et cetera. Each of the horizontal conductors is connected to a row driving network 27 which supplies driving currents to selected ones of the conductors as desired. Driving network 27 may comprise one of the many matrix access circuits known in the art and may utilize electron tube, semiconductor or magnetic elements as the driving means. Due to the low current drive requirements of the invention, the latter two driving elements advantageously are employed.

The array of Fig. 1 also comprises a plurality of conductors in the vertical plane, namely, windings 13, 14, 15 and 16. Each vertical conductor is coupled to a plurality of magnetic beads in a column. For example, conductor 13 is coupled to magnetic beads 5, 9, 17 and 18, conductor 14 is coupled to magnetic beads 6, 10, 19 and 20, et cetera. A third conductor, winding 21, is coupled to each of the magnetic beads of the array in series. Each of the vertical conductors is connected to a column driving network 28 which supplies driving currents to selected ones of the conductors as desired. As indicated heretofore, driving network 28 may comprise any known type of access circuit and advantageously includes low current magnetic or semiconductor driving elements.

In the operation of the magnetic array of Fig. 1, a particular magnetic bead may be utilized to store a bit of digital information by energizing the horizontal and vertical windings coupled thereto. For example, if it is desired to store a bit of information in magnetic bead 5, a first signal of at least half the critical amount is applied from column driving network 28 to conductor 13 and a second signal of at least half the critical amount is applied from row driving network 27 to conductor 1. Thus magnetic bead 5 is switched from one state of magnetization to the other. All other magnetic beads of the array are energized either by a half amplitude signal alone or no signal and thus remain in their original state of magnetization. When it is desired to read out the information stored in magnetic bead 5, signals of the proper amplitude and polarity are applied to conductors 1 and 13 from driving networks 27 and 28, respectively, thereby switching the magnetic bead 5 back to its original state of magnetization. As a result of this resetting action an output pulse is induced in readout conductor 21 and therefrom may be applied to any desired utilization device.

Figure 2:
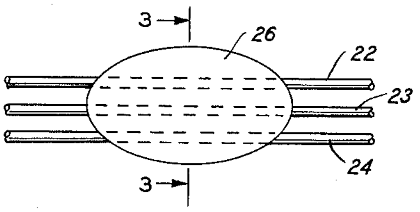
Fig. 2 is an enlarged view of a magnetic bead of the type utilized in the array of Fig. 1.

Fig. 2 shows an enlarged view of a magnetic bead of the type used in the array of Fig. 1. This bead comprises row winding 23, column winding 24 and readout winding 22. It can be seen from the enlarged view of Fig. 2 that the bead and the conductors coupled thereto comprise an integral unit, there being no air space between the conductors and the bead of magnetic material. It will be appreciated by those skilled in the art that although the windings are shown to be in parallel in the illustrative embodiment of Fig. 2 other configurations, such as placing the windings at 45 degree or 90 degree angles with respect to each other are within the purview of the invention. It further will be appreciated that although Fig. 2 shows a bead having three conductors therethrough for purposes of illustration, such beads advantageously may be fabricated having two or more conductors therethrough.

Figure 3:
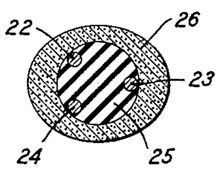
Fig. 3 is a cross sectional view of the magnetic bead of Fig. 2 along the line 3—3 thereof.

Fig. 3 shows a cross sectional view of the magnetic bead of Fig. 2. It there can be seen that each of the conductors 22, 23 and 24 is surrounded by an insulating material 25 to limit the creation of direct current paths between conductors 22, 23 and 24. Advantageously, this insulating material may be $ZrO_2$, $SiO_2$, $Al_2O_3$ or, in certain applications, the ferrite itself. Surrounding the insulating material and the conductors is the bead of magnetic material 26 which advantageously may be a ferrite as described below.

Figure 4:
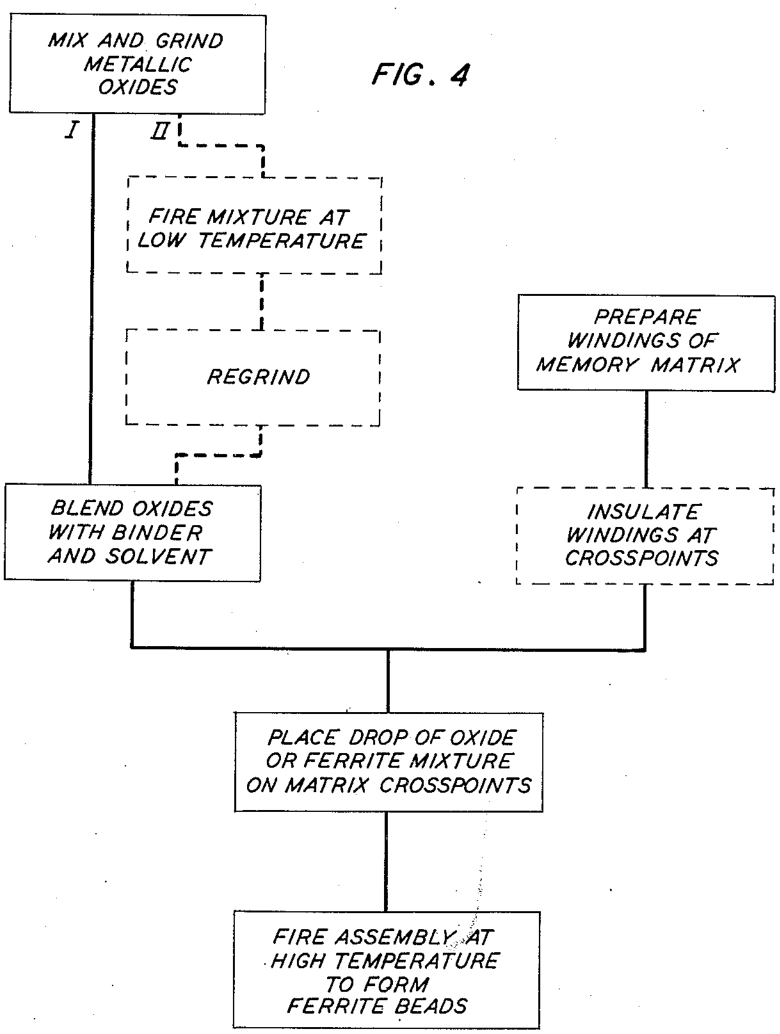
Fig. 4 is a chart depicting methods of fabricating magnetic memory beads in accordance with embodiments of this invention.

Fig. 4 is a chart showing the steps of illustrative methods in accordance with aspects of this invention of fabricating magnetic beads of the type shown in Figs. 1, 2 and 3. In one exemplary embodiment of the invention, following path I of Fig. 4, a plurality of metallic oxides are mixed, ground to a desired particle size in a suitable milling device as is known in the art and then blended with a binder and solvent. In accordance with an aspect of this invention, the metallic oxides advantageously comprise the oxides of magnesium, manganese and iron, but as pointed out heretofore the oxides of zinc, copper, nickel and aluminum also may be used. In one embodiment we have utilized weight percents of the oxides as follows:

| | Percent |
|---|---|
| MgO | 13.1 |
| MnO | 17.8 |
| $Fe_2O_3$ | 69.1 |

Further, in accordance with an aspect of this invention, the binder may comprise polyvinyl acetate and the solvent a mixture of amyl acetate and alcohol.

In accordance with another exemplary embodiment of the invention, following path II of Fig. 4, the metallic oxides are mixed and ground to the desired particle size and then are fired at a low temperature, which advantageously may be approximately 850°–900° C. The resultant ferrite then is reground and blended with a suitable binder and solvent as in the above embodiment.

The memory array which will support the magnetic beads may comprise any type of array suitable for the purpose at hand. In the specific embodiment illustrated herein the array comprises a two dimensional memory matrix of the type shown in Fig. 1. The windings are placed in spatial relation to each other in the manner shown in Figs. 1, 2 and 3. Advantageously, the windings may be insulated from each other by placing a small amount of $ZrO_2$, $SiO_2$, $Al_2O_3$ on each crosspoint, or, if desired, the insulation may be provided by the ferrite itself. A drop of the metallic oxide mixture or ferrite mixture, dependent upon which of the above method procedures I and II are utilized, is then placed on each of the crosspoints so as to completely encompass the conductors and their insulating material and the entire assembly then is fired to form the unitary ferrite beads. This firing may be at a temperature of from 1250 to 1450° C. for a period of thirty minutes or longer. The conductors contemplated herein as comprising elements of this invention must obviously be of a material compatible with the process of fabrication described in the foregoing. Thus, it is readily understood that the conductors which are fired together with the beads must be of an electrically conducting material which can withstand the firing temperatures applied for the periods indicated above. Such conducting materials are well known and one found highly suitable by the present inventors was platinum, having a melting point in the order of 1755° C.

Thus, it can be seen that the above-described technique for fabricating magnetic beads is the opposite of that used in prior art magnetic core matrices in which wires are wound around the magnetic cores. In the instant invention the ferrite material effectively is wound around the wires and accordingly the excessive cost of wiring is reduced. Further, it will be appreciated that memory units in accordance with this invention represent a considerable reduction from the cost of prior art magnetic cores. Still further, it will be appreciated that due to the elimination of the air space between the magnetic material and the windings therethrough both core losses and the current drive necessary to operate the matrix are considerably reduced. It has been shown that matrices using magnetic beads of this type can successfully to be driven with either transistor or magnetic core access switches.

It is to be understood that the above-described arrangements are illustrative of the principles of the invention and that numerous modifications may be made therein without departing from the spirit and scope of the invention.

What is claimed is:

1. A magnetic memory element comprising a globule of ferrite material having substantially rectangular hysteresis characteristics and a plurality of wires consolidated with said globule and having portions entirely embedded in said globule, said wires being insulated from each other and from said ferrite material.

2. A magnetic memory element comprising a plurality of wires spaced from each other, insulating means between portions of said wires, said insulating means uniting said portions of said wires in an integral structure, and a ferrite bead having substantially rectangular hysteresis characteristics solidified to said insulating means and said portions of said wires and in contact with said insulating means.

3. A magnetic memory system comprising a plurality of first conductors and a plurality of second conductors, said plurality of first conductors having junctions with said plurality of second conductors, each of said junctions comprising a bead of ferrite material solidified to the included conductors, the conductors of said plurality of first conductors and said plurality of second conductors being insulated from each other and from said ferrite material, said bead being capable of assuming distinct bistable states of magnetic remanence.

4. A magnetic memory system in accordance with claim 3 further comprising means connected to said plurality of first and second conductors for selectively altering the magnetic states of desired ones of said beads of ferrite material.

5. A magnetic memory system in accordance with claim 4 further comprising a third conductor included in said junctions for sensing a change in the magnetic state of any of said beads, said third conductor being insulated from said plurality of first and said plurality of second conductors and from said ferrite material.

6. A magnetic memory system in accordance with claim 5 wherein each of said beads of ferrite material comprises a combination of the oxides of magnesium, manganese and iron.

7. A magnetic memory element comprising a plurality of conductors, a bead of ferrite material solidified to said conductors, said material having substantially rectangular hysteresis characteristics, and means for applying energizing signals to said conductors for determining the magnetic condition of said bead.

8. A magnetic memory element in accordance with claim 7 wherein said bead of ferrite material comprises the oxides of magnesium, manganese and iron.

9. A magnetic memory system comprising a plurality of first conductors, a plurality of second conductors, each of said first conductors having a junction with each of said second conductors, each of said junctions having a fluid-deposited bead of a ferrite material having substantially rectangular hysteresis characteristics thereon, the conductors of said plurality of first conductors and said plurality of second conductors being insulated from each other and from said ferrite material, and means for inducing a particular condition of remanent magnetization in particular ones of said beads when in a solid state comprising means for selectively applying current pulses to said first and second conductors having junctions with said particular beads.

10. A magnetic memory system according to claim 9 also comprising other means for selectively applying other current pulses to said first conductor and second conductors having junctions with said particular beads for switching said particular condition of remanent magnetization, and a third conductor insulated from said first and second conductors and from said ferrite material included in each of said junctions energized responsive to said switching of said particular condition of remanent magnetization for generating an output signal.

11. A magnetic memory device comprising a plurality of electrical conductors arranged in a predetermined relationship and a mass of a magnetic material having a substantially rectangular hysteresis characteristic inductively solidified around and embedding each of said plurality of conductors.

12. A magnetic memory matrix comprising a plurality of electrical conductors arranged to form a coordinate array and a plurality of ferrite masses having substantially rectangular hysteresis characteristics inductively solidified to said conductors at intersections of said conductors in said coordinate array, said conductors being insulated from each other and from said masses.

13. A magnetic memory device comprising a plurality of electrical conductors and a bead of a ferrite material having a substantially rectangular hysteresis characteristic formed directly on said conductors, said conductors being insulated from each other and from said ferrite material.

References Cited in the file of this patent

UNITED STATES PATENTS

| | | |
|---|---|---|
| 2,457,806 | Crippa | Jan. 4, 1949 |
| 2,700,150 | Wales | Jan. 18, 1955 |
| 2,724,103 | Ashenhurst | Nov. 15, 1955 |
| 2,743,507 | Kornei | May 1, 1956 |
| 2,746,130 | Davis | May 22, 1956 |
| 2,792,563 | Rajchman | May 14, 1957 |